Patented Dec. 18, 1945

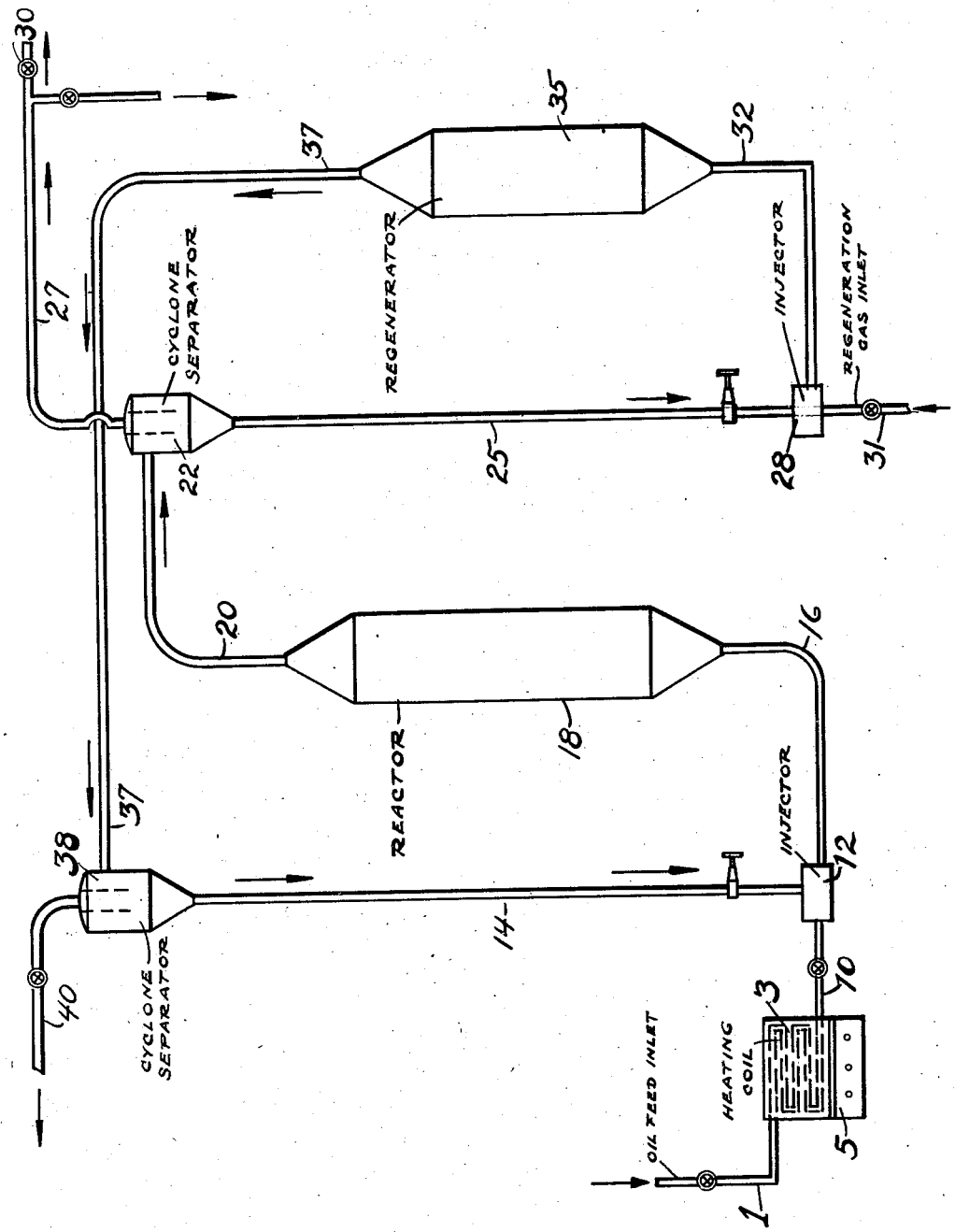

2,391,367

UNITED STATES PATENT OFFICE 2,391,367

REFINING PROCESS

Willie W. Hodgeson, Baker, La., assignor to Standard Oil Development Company, a corporation of Delaware Application December 23, 1941, Serial No. 424,155

9 Claims. (Cl. 196—52)

My present invention relates to improvements in the art of refining, and more particularly it relates to the operation of a continuous cracking process during the initial phases thereof, all of which will more fully and at large appear hereinafter.

It is generally known that for the last ten or fifteen years the oil industry has developed as a result of considerable research, what is known as the catalytic method of cracking oils to produce gasoline of high octane number. One of these general types or processes is known as the stationary bed type of operation or, in other words, processes in which the catalyst is supported on foraminous trays in a reactor, through which trays the hydrocarbon vapors to be cracked are passed at cracking temperatures. There comes a time in such processes when the catalyst becomes contaminated with tarry deposits, necessitating a discontinuance of the on-stream operation to revivify or regenerate the catalyst. This type of operation is, therefore, intermittent.

A second type of operation is one which may be operated continuously and in one modification, involves suspending a powdered catalyst, that is to say a catalyst having a particle size of from 80 to 400 mesh, in the oil vapors to be cracked, causing this suspension to flow through a reaction zone maintained under cracking conditions. The cracked products are continuously withdrawn from the reaction zone, separated from the catalyst, the latter is regenerated and returned to the reaction zone for further use in the process. The separated reaction products meanwhile are condensed and fractionated in the usual manner to recover gasoline and other desired products. This type of operation, as previously indicated, may be operated continuously.

Although the continuous process has many obvious advantages over the stationary bed or intermittent type of operation, nevertheless, there comes a time in such an operation when, for one reason or another, it is necessary to discontinue the cracking operation. Various mechanical difficulties arising somewhere in the equipment, such as the failure of pumps, difficulties in the heat exchangers, etc., may cause, as stated, interruption of the process.

It is pointed out that in a continuous operation for cracking hydrocarbon oils, the best procedure is one in which the reactor is maintained at a temperature of about 850–950° F., while the regenerator for the catalyst operates at a somewhat higher temperature, say 1000–1200° F. Now, it will be readily appreciated that if the cracking unit must be shut down or discontinued for some unavoidable reason, that the temperatures in both the reactor and the regenerator, in fact throughout the whole system, eventually cool to atmospheric temperatures. It is believed to be obvious that before the unit can be started up again and caused to run efficiently that it is necessary to heat the various apparatus elements forming the complete cracking unit to operating conditions.

The object of my present invention resides in the concept of greatly reducing the time necessary to restore a cracking unit which has been shut down for an extended period of time, or for sufficient time to permit the various parts of the unit to cool to atmospheric temperatures, to operating temperature conditions in both the reactor and the regenerator.

My invention will be best understood by reference to the accompanying drawing in connection with the more detailed description I am about to set forth.

In the figure of the drawing, I have shown diagrammatically the essential elements employed in operating a catalyst cracking unit employing a powdered catalyst.

Referring in detail to the drawing, oil enters the system through line 1 and is heated in coil 3, disposed in furnace 5, to vaporization temperatures or higher. Where the oil is an East Texas gas oil having a gravity of 30° A. P. I., the oil normally would be heated to about 850° F., whereupon it is withdrawn from coil 3 through line 10 and delivered to an injector 12. Catalyst is also discharged to injector 12 from line 14. This catalyst usually in the best procedure is at a temperature of 1000 to 1150° F. and it serves to supply a substantial amount of the heat necessary in the reaction zone. The catalyst, which is an acid treated clay preferably having a particle size of 100 to 400 mesh, forms in injection means 12 a suspension of catalyst in oil vapors and this suspension is withdrawn from injector 12 through line 16 and thence discharged into an upflow reactor 18 where the oil vapors undergo cracking when maintained within the reactor for the time required to effect the desired conversion. The reaction product containing catalyst suspended therein is subsequently run through reactor 18, thence line 20 and discharged into a cyclone separator 22, in which the bulk of the catalyst is separated from the vapors and withdrawn through line 25. The vapors are withdrawn from the cyclone separator through line 27 and thence delivered to fractionating and conditioning equipment, not shown, to recover the products.

The catalyst in line 25 contains carbonaceous deposits and normally it must be purified to remove said carbonaceous deposits. The best procedure is to cause the combustion of these carbonaceous deposits in a regeneration zone. To this end the catalyst may be discharged into an injector 28 where it mixes with regeneration gas discharged into injector 28 through line 31, forming a suspension, which suspension is discharged through line 32 into regenerator 35. The regeneration gas containing free oxygen causes combustion of the catalyst contaminants. The catalyst during regeneration is usually heated to a temperature of 1050° F. or thereabouts. Ordinarily, the regeneration gas enters the system through line 31. Air may be diluted with some inert material so that the oxygen concentration may be from 2 to 13% or thereabouts when the catalyst contains 2% by weight of coke or carbonaceous deposits. Ordinarily, however, pure air may be employed to regenerate the catalyst. The regeneration gas may, if necessary, be preheated to cause immediate combustion of the catalyst contaminants upon contact, but ordinarily at essentially atmospheric pressure the catalyst recovered from the reactor will be at a temperature of around 800° F. and when contacted with air at these temperatures, combustion of the catalyst contaminants will take place.

A suspension of regenerated catalyst and flue gas is eventually withdrawn from regenerator 35 through line 37 and discharged into cyclone separator 38, in which the main bulk of the catalyst is separated from the flue gases. The hot regenerated catalyst may be recovered through line 14 and discharged into injector 12 for re-use in the process as previously indicated. The flue gases are withdrawn from cyclone separator 38 through line 40 and they may be passed through heat exchange systems to recover a portion of their sensible heat and thereafter rejected from the system.

I have gone into some detail in explaining a typical layout or flow diagram representing a powdered catalyst cracking operation. For simplicity's sake I have omitted the multiplicity of storage hoppers, catalyst recycle streams and transfer lines, and various other elements which would be used in a commercial plant.

As previously stated, my invention relates to improvements in the art of operating a plant of the type I have hereinbefore described during the initial phases of the operation, or in other words, when the units of the plant are at ordinary atmospheric temperature, and I shall now proceed to describe in detail how I propose to start up all initial operations in the plant shown in the figure. The first step is to pass air from line 1 through the fired coil 3 and thence into reactor 18, thence through line 20 to cyclone separator 22. By closing valve 30 in line 27 the air is diverted through line 25 through the regenerator, thence through line 37 and thence into cyclone separator 38 and out thru line 40. Air is thus circulated through the system until all parts thereof are at a temperature of about 300° F. Thereafter, steam is discharged into line 1, superheated in fired coil 3 and passed through the system the same as the air.

The steam is superheated to about 800° F. and is circulated through the system until all parts thereof are substantially at this temperature. At this time catalyst preheated to about 800° F. is added to the system in such quantities as will be required for the cracking operation. The catalyst may be heated with flue gas before being charged to the unit. Catalyst circulation is maintained by means of the steam passing through the system. After the catalyst has been charged to the system the steam supply is gradually replaced with oil vapors. During the initial stages of circulating oil through the reactor system the catalyst circulation rate is maintained at a small value. When operating the reactor 18 under normal sustained conditions the catalyst to oil ratio is from about 2/1 to 6/1. However, if a catalyst to oil ratio in this range is used during the starting up operation coke will be formed on the catalyst at a faster rate than it can be burned off at the low temperature prevailing in the regenerator. This will result in an accumulation of coke on the catalyst with resultant irregular operation and a longer time will be required to get the unit on good operating conditions. However, by using a low catalyst circulation rate, or in other words a low catalyst to oil ratio, for example about 0.5 pound of catalyst per pound of oil, the residence time of the catalyst in the regenerator is increased to such an extent that the combustion of the coke is substantially complete even at the low temperatures prevailing in the regenerator during the starting up operation. The catalyst to oil ratio may be gradually increased as the temperature in the regenerator rises until the ratio desired for sustained operation has been reached. A further factor involved is that with high concentrations of coke on the catalyst, the catalyst density in the regenerator decreases. To compensate for this, the inlet concentration of catalyst has to be increased. This has to be accomplished by recycling catalyst to the regenerator. However, heat is lost during the recycle operation so that the time to get the system to the desired operating temperature is increased. By operating at low carbon concentrations in accordance with the present invention, recycle of catalyst may be avoided so that heat losses are minimized.

It has been found in practice that by employing low catalyst to oil ratios during the starting up operation, the regenerator may be brought up to operating temperatures, namely, about 1050° F. in a much shorter time than would be the case if the same ratio of catalyst to oil had been applied as is used during the normal operation of the unit. For example, it has been found that the overall starting time, that is to say from starting the unit at 600° F. until the temperature of the reactor is increased to about 900° F. and that of the regenerator to about 1050° F., is reduced from about six hours to about two hours.

To recapitulate, my invention resides in operating a continuous cracking operation, but it has particular reference to an improved method of obtaining the cracking unit at operating temperature as to all parts thereof in the shortest time following a shutdown period when the whole unit has cooled to room temperature. I do not assert that my invention includes bringing the unit up to a temperature of 800° F. because this was previously done by resorting to the use of superheated air then superheated steam. My invention resides in bringing the regenerator and reactor up to operating conditions in the shortest possible time by producing only a low percentage of coke on the catalyst during the initial stages of the operation so that the regenerator can operate efficiently at reduced temperatures.

Among the advantages of my invention are the reduction in the time required for starting the operation, a reduction in catalyst losses which are abnormally high when the percentage of carbon on the catalyst is high, and the minimization of the danger of overheating the catalyst with the subsequent degradation that would be involved.

In operating a cracking unit or plant of the type illustrated in the drawing, the best operating conditions include the step of recycling regenerated catalyst to the regenerator to remove at least a portion of the heat over and above that necessary to maintain the endothermic cracking reaction. This extra heat can be used to preheat the vapors entering the reaction zone to raise their temperature to reaction temperatures so that it becomes important in an operation of the kind herein described to maintain the temperature in the regenerator higher than that in the reactor and to employ at least a portion of the heat released during the exothermic reaction of oxidation to supply that necessary for the endothermic reaction.

What I claim is:

1. In the operation of a continuous method for cracking hydrocarbon oils in the vapor phase in the presence of a suspended catalyst passed through a cracking zone and a regeneration zone wherein coke deposits are burned off, the improvement which comprises raising the temperature of the system to operating conditions by supplying heat to the system and employing during the initial phases of the cracking operation a catalyst to oil feed ratio substantially lower than the ratio preferred for the normal operation so as to produce a small amount of coke on the catalyst while the temperatures in the cracking and regeneration zones are still below the limits of normal operation; and increasing the catalyst to oil feed ratio as the temperature values in the system increase until the desired normal cracking and regeneration temperatures and the desired normal catalyst to oil feed ratio are attained.

2. In a continuous method for cracking hydrocarbon oils in the vapor phase in the presence of a suspended catalyst passed through a cracking zone and a regeneration zone wherein coke deposits are burned off, the improvement which comprises initiating the process by first passing heated air through the system of retorts and transfer pipes in which the operation is performed, thereafter passing super-heated steam through the system and finally feeding oil and catalyst to the system, the feed ratio of catalyst to oil being substantially smaller than the feed ratio preferred for the normal operation, until the entire system has been heated to normal reaction temperatures, whereafter the feed ratio of catalyst to oil is raised to the feed ratio preferred for normal operation.

3. In the method of catalytically cracking hydrocarbon oil in the presence of powdered catalyst suspended therein in a process which is operated continuously and includes a regeneration phase wherein coke deposits are burned off the catalyst, the improvement which comprises bringing the necessary equipment for carrying out such a process from atmospheric to operating temperatures by first heating the equipment by means of heated air, further heating the equipment by means of superheated steam, and finally bringing the equipment up to reaction temperatures and regeneration temperatures by feeding oil to the system together with catalyst, the catalyst to oil feed ratio being substantially lower than the ratio preferred for normal operation; and increasing the catalyst to oil feed ratio to reach the ratio for normal operation when normal operating temperatures are attained.

4. The process set forth in claim 2 in which the catalyst to oil preferred normal feed ratio by weight is from 2 to 6 lbs. of catalyst per pound of oil.

5. The process set forth in claim 2 in which at the beginning of the operation the system is at atmospheric temperature, it is thereafter heated by heated air to a temperature of about 300° F., is thereafter heated by superheated steam to a temperature of about 800° F., and it is finally brought up to final temperatures by employing the exothermic heat released in regenerating fouled catalyst resulting from contact of the catalyst with oil in a reaction zone.

6. The process set forth in claim 2 in which the catalyst to oil feed ratio is about 0.5 lb. of catalyst per pound of oil during the period immediately following the heating of the unit by means of superheated steam.

7. Process set forth in claim 3 in which the catalyst to oil preferred normal feed ratio is from 2 to 6 lbs. of catalyst per pound of oil.

8. The process set forth in claim 3 in which the temperature of the regeneration phase is increased from a 600° F. to about 1050° F. in a period of about 2 hours.

9. The process specified in claim 3 in which the initial feed ratio of catalyst to oil is about 0.5 lb. of catalyst per pound of oil and in which this feed ratio is increased to a normal preferred feed ratio under preferred operating conditions of from about 2 to 6 lbs. of catalyst per pound oil.

WILLIE W. HODGESON.